Dec. 4, 1951  F. A. JENKS  2,576,943
WAVE GUIDE MODULATION APPARATUS
Filed Jan. 31, 1945  2 SHEETS—SHEET 1
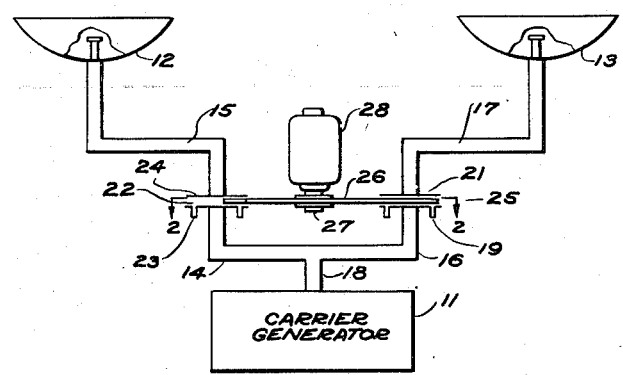
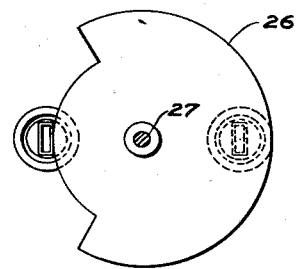
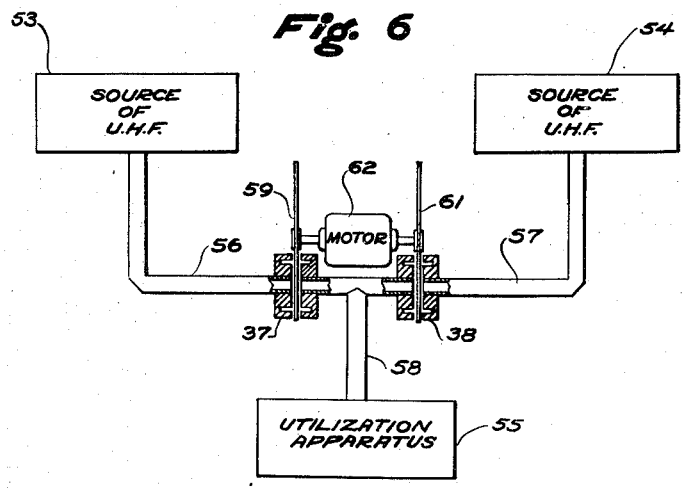
INVENTOR
F. A. JENKS
BY
Paul B. Hunter
ATTORNEY INVENTOR
F. A. JENKS
BY Paul B. Hunter
ATTORNEY Patented Dec. 4, 1951

2,576,943

UNITED STATES PATENT OFFICE 2,576,943

WAVE GUIDE MODULATION APPARATUS

Frederic A. Jenks, Rockville Centre, N. Y., assignor to The Sperry Corporation, a corporation of Delaware Application January 31, 1945, Serial No. 575,415

4 Claims. (Cl. 250—33.63)

1

This invention relates generally to the modulation or interruption of radio waves, and more particularly to a method and means for modifying the amplitude of ultra high frequency energy during its transmission from one or more sources to one or more utilization circuits.

The present application is a continuation-in-part of application 491,165, entitled Stereoscopic Observation System and filed June 17, 1943, Patent No. 2,540,121, dated February 2, 1951, in the name of Frederic A. Jenks.

Radio systems for the guidance of mobile craft are common that are characterized by the provision of a pair of partially overlapping patterns comprising either radiation or reception directivity characteristics forming a line or, more generally speaking, a surface in space defined by points either at which signals are received from the radiation patterns with equal relative intensity or from which points signals must be transmitted to be received by the reception patterns with equal relative intensity.

Direction finding radio receivers embodying this principle are well known. When employed for reception these patterns represent the characteristics of receiving antennas which in a preferred type of apparatus are alternately connected to a radio receiver. The receiver amplifies and detects signals collected by the antennas and provides an output voltage having an amplitude which varies in accordance with the energy collected by the antenna momentarily utilized. This output voltage may either be switched in synchronism with the antennas and supplied in opposition to a zero-center galvanometer to obtain a measure of the difference in the signa's and thus a directional indication, or alternatively the output voltage may be applied to a dynamometer type directional indicator, where it is compared with a reference alternating voltage synchronized with the switching cycle. Other forms of this direction finding system obtain a polarity or phase reversing directional error signal in order to actuate a follow-up mechanism adapted to rotate the antennas until the radio waves are received with equal intensity. The present invention is particularly useful in carrying out this antenna switching operation efficiently and noiselessly at ultra high frequencies where conventional commutators and discharge tubes cannot be employed.

Radio beacon systems which lay down a course in a predetermined direction by means of these partially overlapping patterns in the form of radio beams are much used for lateral guidance

2 of aircraft and also for vertical guidance during instrument landing descents. These beams must be distinctively characterized to provide not only an indication of displacement from the equisignal surface but also a directional sense for any indicated displacement.

It has been customary in ultra high frequency instrument landing systems to employ a single, constant frequency source of waves and characterize the two beams defining the equisignal surface by different audio frequency modulations. It has also been found necessary to transmit the radio beams alternately to avoid destructive wave interference in space resulting in erroneous on-course indications.

Relatively simp'e electromechanical means have been disclosed by the prior art to effect both modulation and switching of the beams by periodically altering the transmission characteristics of the paths over which the high frequency energy is supplied to the radiators. The term "modulation" here refers to variation of the amplitude of radio frequency energy according to an harmonic modulation wave comprising at least a series of several alternations. The term "switching" refers to the suppression of transmitted energy over intervals of appreciable length, as for example, over interva's corresponding in length to the time required for several cycles of the modulation.

One of the most satisfactory of these modulating and switching devices for ultra high frequencies comprises cavity resonators placed between sections of transmission lines connecting the generator to the radiators. Rotatable disks having peripheral irregularities cooperate with each of the resonators and are adapted to recurrently vary the natural frequency thereof, thereby correspondingly varying the coupling between the generator and the radiators during alternate portions of an iterated cyc'e, and are also adapted to maintain the resonators at a constant natural frequency during the alternate remainder portions of the cycle. Thus, the combined action of the rotatable disks and resonators is to switch the energy between the two radiators and amplitude modulate the same at a distinct frequency according to the radiator momentarily energized.

Although these resonator modulators constitute a marked simplification and advance over purely electronic devices, and at the same time introduce no moving or intermittent electrical contacts, yet each resonator is necessarily highly frequency sensitive and requires input and output coupling adjustments together with tuning means to insure that not only is maximum power transmitted to each radiator but also that the power is equalized between the two beams with minimum cross-modulation of the same.

It is, therefore, the prime object of the present invention to provide a simplified and improved method and means for modulating and/or switching ultra high frequency energy between one or more sources and one or more utilization circuits.

Another object is to provide a substantially non-resonant transmission line modulator device requiring no critical tuning adjustments.

A further object lies in the provision of an economical and rugged transmission line modulator or energy transfer switch which may be manufactured with more liberal mechanical tolerances than previously known devices for the same purpose.

Yet another object of the invention is to provide rotatable interceptor or reflector means adapted to be interposed between aligned openings of wave guide conduit sections so as to amplitude modulate the energy flowing through the conduits in accordance with the rotational frequency of the interceptor or reflector means and its configuration.

Other objects and advantages will become apparent as the description proceeds and after consideration of the illustrated embodiments wherein those features of the invention are disclosed that accomplish the above objects.

In the drawings:

Fig. 1 is a schematic diagram of one form of electromechanical wave guide switch embodying the present invention.

Fig. 2 is a detail of a reflector disk employed in the system of Fig. 1.

Fig. 6 is a block diagram in partial cross-section illustrating an alternate form of the invention employing physically separate reflector means for each of several wave guides.

Similar reference numerals are employed to indicate corresponding parts in the above figures.

Figure 3:
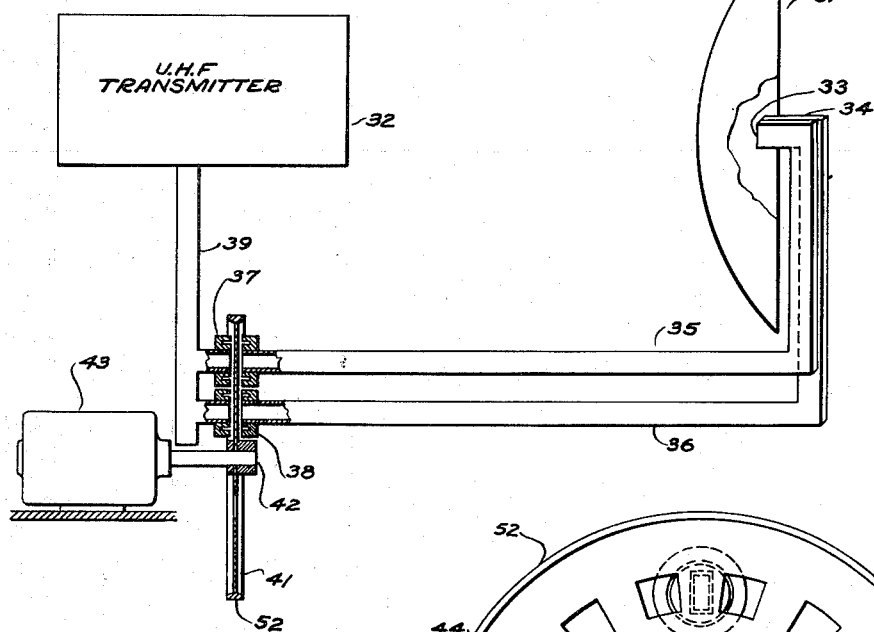
Fig. 3 is a diagrammatic representation of a double-beam radio transmitter employing a form of the switching and modulating means disclosed by the present invention.

In its essential form, the present invention contemplates interposing wave interceptor or reflector means between juxtaposed sections of a wave guide conduit which couples a source of ultra high frequency energy to its utilization circuit for the purpose of varying the energy flow. The flow may be switched on-off or may be modulated to any desired extent. This switching or modulation may be achieved by varying the amount or position of that portion of the reflector means interposed between the conduit sections. This variation is conveniently accomplished by providing relative rotation between the conduit sections and reflector or interceptor means possessing reflecting or short-circuiting properties that are altered throughout the area aligned with the conduit cross-section. The interceptor or reflector means may take many forms. It is well known, for example, that a grid structure, comprising a large number of wires designed to co-incide with the electric field, serves as an excellent reflector or short-circuit therefor and requires a minimum of material and weight, yet manufacturing economy and ruggedness tend to make a simple conducting surface reflector preferable for most commercial applications. Interceptor means utilizing portions of reflecting surfaces have been chosen to illustrate the invention, and such reflector means effect alterations in their reflecting abilities by providing holes or windows in the reflecting surfaces, making the edges thereof irregular, or mounting the surfaces eccentrically.

It is contemplated utilizing the reflector means in wave guides, for example, partially or entirely filled with solid dielectric and having round, elliptical or other cross-sections, but the particular structures chosen for illustration cooperate with air filled rectangular conducting wave guides, since this latter type of guide is most commonly employed in the art.

The spaced wave guide ends forming the gap into which the interceptor means is interposed, are furnished with means for inhibiting radiation loss therefrom. This radiation inhibiting means does not of itself form a part of the present invention and may conveniently take the form of a well-known choke joint or wave trap, such as the one described in Practical Analysis of Ultra High Frequency, by Meagher and Markley, published by RCA Service Company, Inc., in 1943.

Referring now to Fig. 1, a carrier generator 11 is arranged to provide ultra high frequency energy alternately to radiators 12 and 13 through the agencies of wave guide branch sections 14, 15 and 16, 17, respectively, supplied through a common wave guide feeder portion 18. Wave guide sections 14 and 16 are physically separated by gaps 22 and 25 from their companion wave guide sections 15 and 17, respectively. Juxtaposed wave guide sections 14 and 15 and, similarly disposed sections 16 and 17 are spaced sufficiently to enable a metallic disk 26 mounted on a shaft 27 of a motor 28 to be rotatably interposed therebetween. The disk shown in detail in Fig. 2 has a portion of its periphery cut away in order that the gaps 22 and 25 be alternately exposed when the motor 28 is in operation. Thus, the action of the rotating disk is first to permit and then to interrupt flow of energy from generator 11 to radiators 12 and 13 in succession. The frequency with which the energy is transferred or commutated between radiators 12 and 13 is seen to be determined by the speed of motor 28, and the relationship between the active and inactive portions of the switching cycle is predetermined by the physical configuration of the disk 26.

In order to minimize leakage of energy out of the gaps 22 and 25 and permit maximum transmission across these gaps from the radiating wave guides 14 and 16 to their respective receiving wave guides 15 and 17, radiation inhibiting means are provided in the form of wave trap or choke couplings comprising metal plates 23 and 19 mounted level with the ends of wave guides 14 and 16, respectively, and formed with an annular closed slot stamped therein approximately a quarter wavelength deep at the operating frequency and a quarter wavelength distant from the wave guide openings. Metallic plates or flanges 24 and 21 are placed flush with the ends of wave guide sections 15 and 17, respectively, and co-operate with plates 23 and 19, respectively, to present high impedance to energy attempting to flow transversely of the wave guides and at the same time offer low impedance to transmission therealong. These choke joints or wave trap couplings are well known in the art as mentioned above.

The alternate interposition of the disk 26 in gaps 22 and 25 gives rise to reflections of the ultra high frequency waves at these points. The lengths of wave guide sections 14 and 16 are such as to produce an apparent open-circuit at the junction of these guide sections with feeder 18 whenever the disk 26 blocks the respective guide opening. Thus, there is no appreciable loss of power in the apparatus, substantially all the generated energy being transferred from one radiator to the other in succession.

The separation of the portions of the wave trap coupling may be made sufficiently great to permit the employment of a sturdy reflector disk and also allow for considerable mechanical clearance. For example, it has been experimentally found that at a wavelength of 3.2 cm. a spacing of 5 mm. can be utilized with a loss of only 5% of the energy transmitted across the gap if a simple wave trap or choke joint of the type described is employed. Without any transverse radiation inhibiting means, however, only 30% of the power was found to be transmitted.

It has also been empirically determined that the location of the reflection produced by intercepting means, such as the metallic disk 26 is very closely in the plane of the wave guide opening rather than being located in the plane of the interceptor or reflector itself. This is highly advantageous since slight vibration of the disk 26 or variation in its distance from the wave guide section 14 or 16 has substantially no effect on the position of the reflecting plane. Thus liberal mechanical tolerances may be permitted without reducing the efficiency of the system as a result of detuning.

Referring now to Fig. 3, there is shown a form of the invention adapted to provide partially overlapping means which are distinctively modulated and are alternately transmitted from a single directive reflector 31 which may form a paraboloid. These beams are radiated from adiacent mouths 33 and 34 of wave guides 35 and 36, respectively, placed on either side of the focus of reflector 31 which is viewed in elevation. Wave guides 35 and 36 are energized through choke joints 37 and 38 fed by a common wave guide 39 from an ultra high frequency transmitter 32.

Joints 37 and 38 are shown to be of the so-called "choke-to-choke" symmetrical construction, each comprising a pair of annularly slotted wave trapping members placed on opposite sides of the gaps between wave guides 35, 36 and guide 39. The operation of these chokes on the side nearest the source of ultra high frequency energy is identical to that of the chokes shown in Fig. 1 but the former possess the additional advantage of greatly reducing any possible leakage of energy from guide 35 to guide 36 or vice versa, which would result in cross-modulation of the radiated beams.

Although it is rarely necessary, multiple filters in the form of additional concentric one-quarter wavelength deep slots may be formed spaced one-quarter wavelength from each other in the choke members. This more elaborate construction enables radiation losses at the gaps to be reduced to any desired degree.

The choke joints 37, 38 are arranged side by side in order that a reflector disk 41 may intercept them on one side of a shaft 42 which supports the disk and is driven by motor 43. In this particular embodiment of the invention the disk 41 has rim 52 around its circumference for stiffening purposes.

The coupling between adjacent wave guides 35 and 36 may also be substantially eliminated by coating the surface of disc 41 on the far side of transmitter 32 with a material of high resistivity for the purpose of attenuating any energy seeking to propagate transversely of the wave guide openings.

Figure 4:
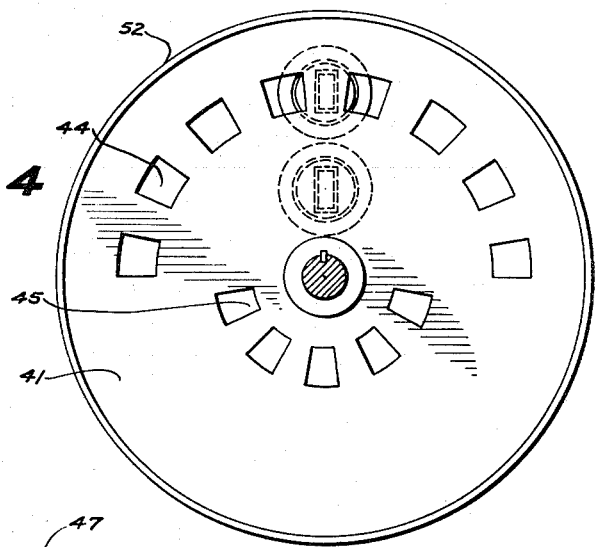
Fig. 4 is an enlarged detail of an interceptor disk adapted to be employed in the system of Fig. 3 and shows a configuration suitable for instrument landing purposes.

A possible configuration of the disk 41 is shown in Fig. 4 where it has been arbitrarily assumed for illustrative purposes that the disk is synchronously rotated at 3600 R. P. M., and that it is desired to modulate the beam emitted by wave guide 35 at 900 cycles a second for one-half the switching period and the beam emitted by wave guide 36 at 600 cycles a second during the other half of the period. It might appear necessary to vary the energy emitted by guide 35 7½ times during the half cycle, and the energy transmitted by the other guide 5 times during the other half cycle. Since it is impossible to modulate sinusoidally a fractional cycle, 8 outer windows 44 and 5 inner windows 45 are cut in the disk 41 to permit periodic transmission of energy from the wave guide 39 to wave guides 35 and 36, respectively. The windows 44 are angularly spaced in the proportion of 15 to the circumference of the disk, and are disposed in a semicircle opposite the windows 45 which are angularly spaced in the proportion of 10 to the circumference of the disk.

These windows are shown to subtend angles from the center of the disk 41 equal to those subtended by the adjacent reflecting sectors. The rectangular wave guides 35 and 36 are positioned with their greatest transverse dimensions lying along the radius of the disk. Windows 45 are just equal in minimum dimensions to the interior cross-section of wave guide 36.

Figure 5:
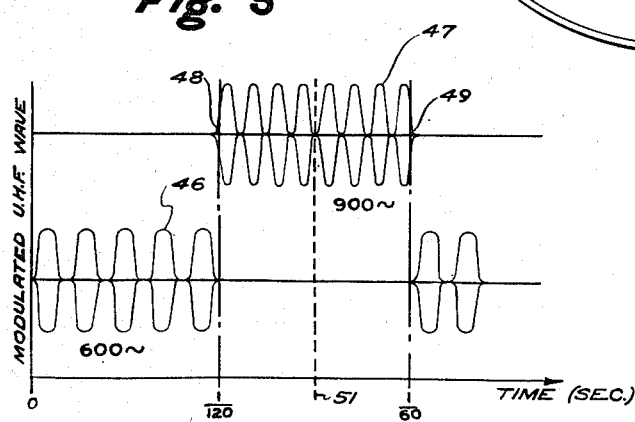
Fig. 5 is a graph illustrating the amplitude envelope of the waves radiated by the system of Fig. 3 when the interceptor disk shown in Fig. 4 is employed.

Fig. 5 illustrates the modulation envelope and transmission sequence produced by such a disk configuration as is shown in Fig. 4. Modulation envelope 46 shows that there are five substantially sinusoidal amplitude variations in the energy transmitted through wave guide 36 during every other half rotation of the disk 41. Envelope 47 shows eight similar amplitude variations in the energy transmitted through wave guide 35 during slightly more than the half periods between the intermittent production of envelope 46. As a result of the necessity for employing an integral number of windows 44, the choice of eight windows causes portions of the 900 cycle modulation envelope 47 to overlap slightly in time the 600 cycle modulation envelope 46.

In instrument landing applications, no radio interference has been observed from this cause, since the overlapping portions indicated at 48 and 49 are relatively short compared to an entire modulating cycle, and the amplitudes of both beams are small during these times. The dashed line 51 represents the momentary time position in which the disk 41 has been illustrated in Fig. 4.

It must be emphasized that Figs. 4 and 5 illustrate a particular switching and modulating condition merely as an example. Even this same modulating and switching sequence may be achieved by many different configurations. The windows 44, for example, might be merely portions cut from the periphery of disk 41 and the stiffening rim 52 might be eliminated.

The choke joints 37 and 38 may be disposed on opposite sides of shaft 42, and thus permit a slight reduction in the diameter of the disk 41. Under these conditions obviously windows 45 would occupy the same half of the disk 41 as windows 44. This physical separation of chokes 37 and 38 would reduce the possibility of any mutual coupling between wave guides 35 and 36. Another arrangement for performing the modulating and switching cycle illustrated in Fig. 4, may be realized by cutting the wave guide openings in the direction of their greatest transverse dimension. Under these conditions, the electrical field would be directed radially of the disk 41, and it would be possible to reduce the reflecting areas between windows 44 and 45, respectively, to a fraction of the window areas while still achieving substantially 100% modulation of the energy flowing through the wave guides. That it is unnecessary to block the entire wave guide opening physically may be understood by observing that the electric field intensity for the most commonly employed mode of propagation is concentrated at the center of the greatest transverse dimension and falls to zero at the wave guide sides. In general, it may be stated that the shape of the window is uncritical, and its alteration only slowly affects the harmonic content of the modulation envelope.

Referring now to Fig. 6, there is illustrated a form of the invention which finds application in the direction finding radio systems previously discussed. A pair of sources of ultra high frequency energy 53 and 54 supply a utilization apparatus 55 according to a time sequence predetermined by the wave guide modulating apparatus of the present invention. Sources 53 and 54 are connected by wave guides 56 and 57, respectively, to symmetrical or "choke-to-choke" joints 37 and 38, respectively. The output sides of joints 37 and 38 connect to a common wave guide 58 feeding the utilization apparatus 55. Physically separate interceptor disks 59 and 61 cooperate with joints 37 and 38, respectively, and are actuated in synchronism by a motor 62. Disks 59 and 61 may conveniently have their peripheries notched or cut away according to the particular modulating or switching requirements.

If sources 53 and 54 are receiving antennas and the apparatus 55 comprises a receiver and direction indicator, then disks 59 and 61 are so formed as to alternately supply signals to apparatus 55 at a periodicity sufficiently high to permit easy audio amplification and steady indication. It is evident that since joints 37 and 38 are symmetrical the direction of energy flow may be reversed, device 55 then being a source of power and devices 53 and 54 becoming load circuits.

Inasmuch as the present invention has very general utility in the control of ulta high frequency energy, and is in no way limited to direction finding, instrument landing, or such specific applications, the discussion of the same, is merely by way of example.

What is claimed is:

1. An amplitude modulator of radio frequency oscillations, comprising a first wave guide conduit having a radiating end for emitting said oscillations, a second wave guide conduit having a receiving end disposed opposite and adjacent the radiating end of said first conduit for receiving said oscillations, filter means associated with said conduit ends for inhibiting radiation transversely thereof, rotatable reflector means having an angularly varied reflectivity characteristic, said reflector means being interposed between said conduit ends, said filter means comprising substantially parallel conductive flanges on said conduit ends, at least one of said flanges having a quarter-wavelength deep annular recess or groove surrounding the wave guide end, the faces of said flanges being spaced apart sufficiently to permit said reflector means to pass freely therebetween and forming a wave emergence inhibitor, and motive means for rotating said reflector means to amplitude modulate the oscillations received by said second conduit.

2. An amplitude modulator of radio frequency oscillations, comprising a first wave guide conduit having a radiating end for emitting said oscillations, a second wave guide conduit having a receiving end disposed opposite and adjacent the radiating end of said first conduit for receiving said oscillations, filter means associated with said conduit ends for inhibiting radiation transversely thereof, and a rotatable conducting disk aligned with said conduit ends, said filter means comprising a pair of substantially parallel conductive flanges on said conduit ends, at least one of said flanges having a quarter-wavelength deep annular recess in its face surrounding the wave guide end, the faces of said flanges being spaced apart sufficiently to permit said disc to pass freely therebetween, said disk having a configuration such that coupling between said conduit ends is varied as said disk is rotated, thereby amplitude modulating the oscillations received by said second conduit.

3. An apparatus for conducting ultra high frequency electromagnetic energy from a source of power successively to alternate load circuits, the combination comprising a pair of transversely slotted wave guide conduits between said source and said circuits, wave trap means associated with the slot in each of said conduits to inhibit loss of energy therefrom, and reflector means adapted to extend alternately through each slot and across the respective guide conduit, thereby intermittently interrupting the flow of energy therethrough, said wave trap means comprising a pair of substantially parallel conductive flanges on each of said conduits adjacent the slot thereof, at least one of the flanges of each pair having a quarter-wavelength deep annular recess or groove surrounding the conduit, the faces of said flanges being spaced apart sufficiently to permit said reflector means to pass freely therebetween and forming a wave emergence inhibitor together with said reflector means.

4. In an energy distribution system, a high frequency energy source, two radiators connected thereto by individual transmission paths, each path including a pair of wave guiding conduit sections having juxtaposed ends spaced to form a gap, wave trap means associated with each pair of said ends for inhibiting radiation of energy from the respective gaps, rotatable interceptor means projecting between said pairs of ends, said wave trap means comprising a pair of substantially parallel conductive flanges on said juxtaposed conduit ends, at least one of said flanges of the pair having a quarter-wavelength deep annular recess or groove surrounding the conduit end, the faces of said flanges being spaced apart sufficiently to permit said interceptor means to pass freely therebetween and forming a wave emergence inhibitor together with said interceptor means, and motive means for operating said interceptor means to alter periodically the distribution of energy between said radiators.

FREDERIC A. JENKS.

REFERENCES CITED

The following references are of record in the file of this patent:

UNITED STATES PATENTS

| Number | Name | Date |
|---|---|---|
| 2,106,771 | Southworth | Feb. 1, 1938 |
| 2,129,712 | Southworth | Sept. 13, 1938 |
| 2,267,951 | Roosenstein | Dec. 30, 1941 |
| 2,297,512 | Von Baeyer | Sept. 29, 1942 |
| 2,323,735 | Tawney | July 6, 1943 |
| 2,396,044 | Fox | Mar. 5, 1946 |
| 2,415,242 | Hershberger | Feb. 4, 1947 |
| 2,423,130 | Tyrrell | July 1, 1947 |
| 2,426,992 | Folland et al. | Sept. 9, 1947 |

FOREIGN PATENTS

| Number | Country | Date |
|---|---|---|
| 802,756 | France | Sept. 15, 1936 |

OTHER REFERENCES

"Practical Analysis of Ultra High Frequency," by Meagher et al., published in 1943 by RCA Service Co., Inc., Camden, N. J., page 16.